United States Patent [19]

Shono

[11] 4,003,066
[45] Jan. 11, 1977

[54] MIRROR OPERATING ARRANGEMENT OF SINGLE LENS REFLEX CAMERA

[75] Inventor: Tetsuji Shono, Saitama, Japan

[73] Assignee: Asahi Kogaku Kogyo Kabushiki Kaisha, Tokyo, Japan

[22] Filed: Apr. 9, 1975

[21] Appl. No.: 566,204

[30] Foreign Application Priority Data

Apr. 13, 1974 Japan ............... 49-41871[U]

[52] U.S. Cl. .......................... 354/156; 354/152
[51] Int. Cl.² .......................... G03B 19/12
[58] Field of Search .......... 354/152, 153, 154, 155, 354/156, 158

[56] References Cited
UNITED STATES PATENTS

| | | | |
|---|---|---|---|
| 2,352,177 | 6/1944 | Bolsey | 354/156 |
| 3,532,044 | 10/1970 | Shimomura | 354/156 |
| 3,698,305 | 10/1972 | Alfredsson | 354/155 |
| 3,882,523 | 6/1975 | Nno et al. | 354/156 |

*Primary Examiner*—Edna M. O'Conner
*Attorney, Agent, or Firm*—McNenny, Pearne, Gordon, Gail, Dickinson & Schiller

[57] ABSTRACT

A mirror operating arrangement for a single lens reflex camera in which during mirror operation the mirror rotation shaft moves from a viewing position to a shutter operating position is disclosed. In an individual mirror-up operation, the mirror is swung up without causing the mirror rotation shaft to be moved to the shutter operating position. Upon photographing operation, after the individual mirror-up operation, the mirror rotation shaft is moved to the shutter operating position. The shock of the mirror operating arrangement is decreased by the mirror being previously swung up in the individual mirror-up operation.

8 Claims, 4 Drawing Figures

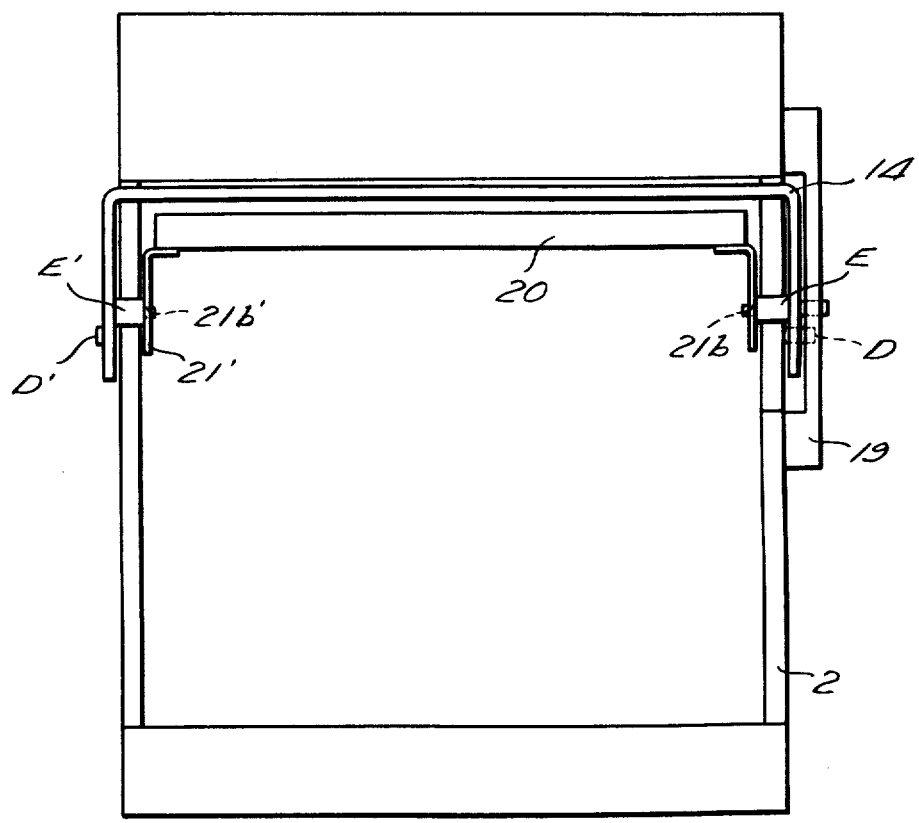

4,003,066

MIRROR OPERATING ARRANGEMENT OF SINGLE LENS REFLEX CAMERA

BACKGROUND OF THE INVENTION AND PRIOR ART

The present invention relates to a mirror operating arrangement for interchangeable lens type single lens reflex cameras.

With respect to the mirror operating arrangement of interchangeable lens type single lens reflex cameras, a considerable number of so-called retrogression type mirror operating arrangements have been devised and put into practice in order to solve the problems of image darkening and narrowing upon utilizing telephoto lenses and the mechanical back restrictions of interchangeable lenses. For cases in which camera shaking must be avoided to as great an extent as possible, such as microscopic and copying photography, individual mirror-up arrangements have been put into practice to avoid mirror shocks.

In accordance with the present invention, upon individual manual mirror-up operation only the front portion of the mirror is moved up, and the remaining move-up action is utilized for shock absorbing of the mirror driving member which has become stronger to the extent of the unnecessariness part of mirror driving power, at the time of shutter release action. The front part of the mirror is fully swung up as viewed from the mount upon lens removal. In the area of the lens attaching mount, the space is scarcely narrower when the mirror is swung up in accordance with the present invention than when the whole mirror is fully swung up, so that the space for super wide angle lenses, fish eye lenses, and similar components which can only be attached with the mirror swung-up, is almost equal to that of fully swung-up mirror cases. Such advantages can not be obtained if the mirror rotation shaft acts as a fixed fulcrum. Further, the shock absorbing arrangement of the present invention considerably decreases the operation noise, and the shock absorbing action is automatically made upon photographing operation during which time camera shaking should be avoided. The shock absorbing member is the conventional mirror itself, so that the foregoing advantages are economically attained without any new members solely included for shock dampening purposes.

BRIEF DESCRIPTION OF THE DRAWINGS

FIG. 4 is an elevational view of the mirror operating arrangement as viewed from the left side of FIG. 3.

DETAILED DESCRIPTION OF THE DRAWINGS

Figure 1:
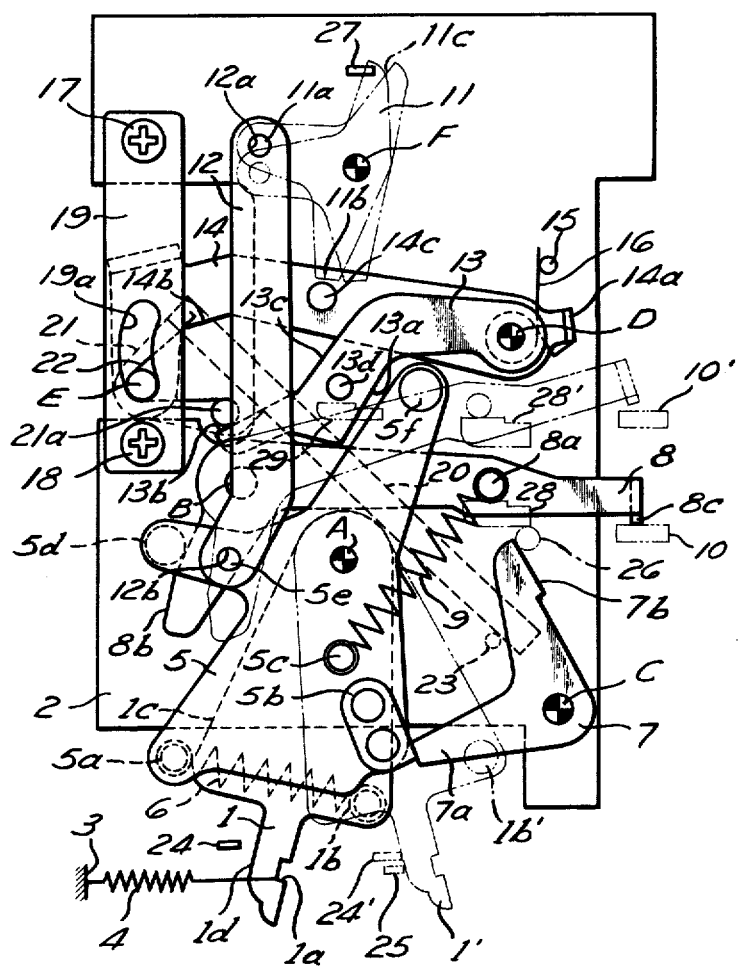
FIG. 1 is an elevational view of the mirror operating arrangement according to the present invention with the mirror in an initial viewing position, with parts omitted for purposes of clarity.
Figure 2:
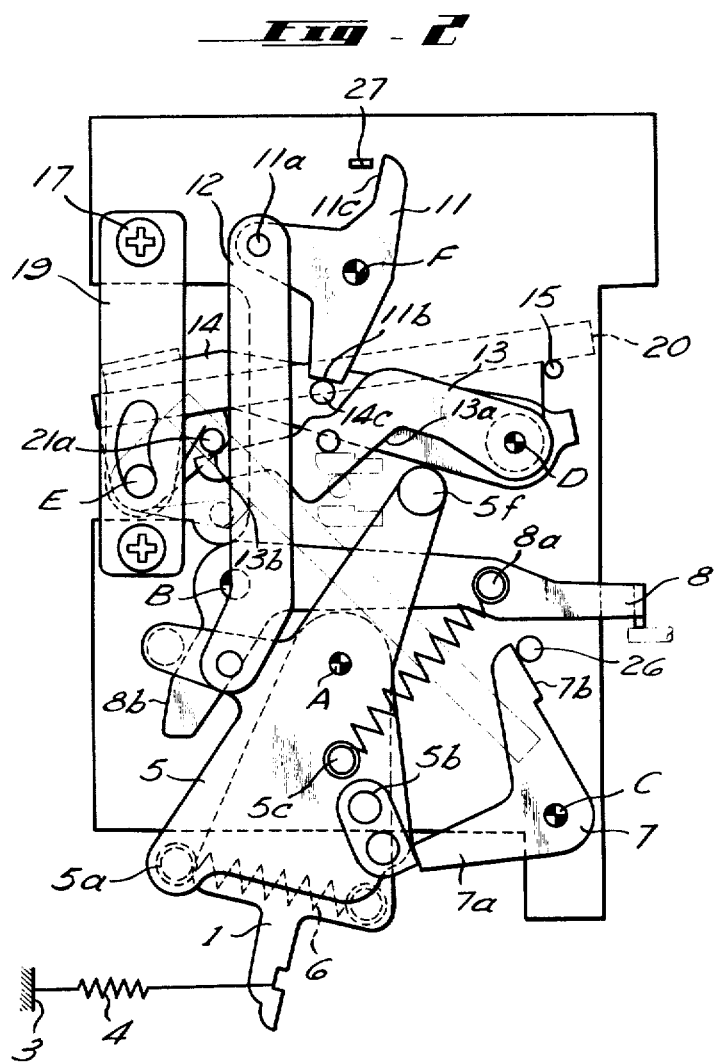
FIG. 2 is an elevational view similar to FIG. 1 depicting the mirror operating arrangement in a mirror-up position.
Figure 3:
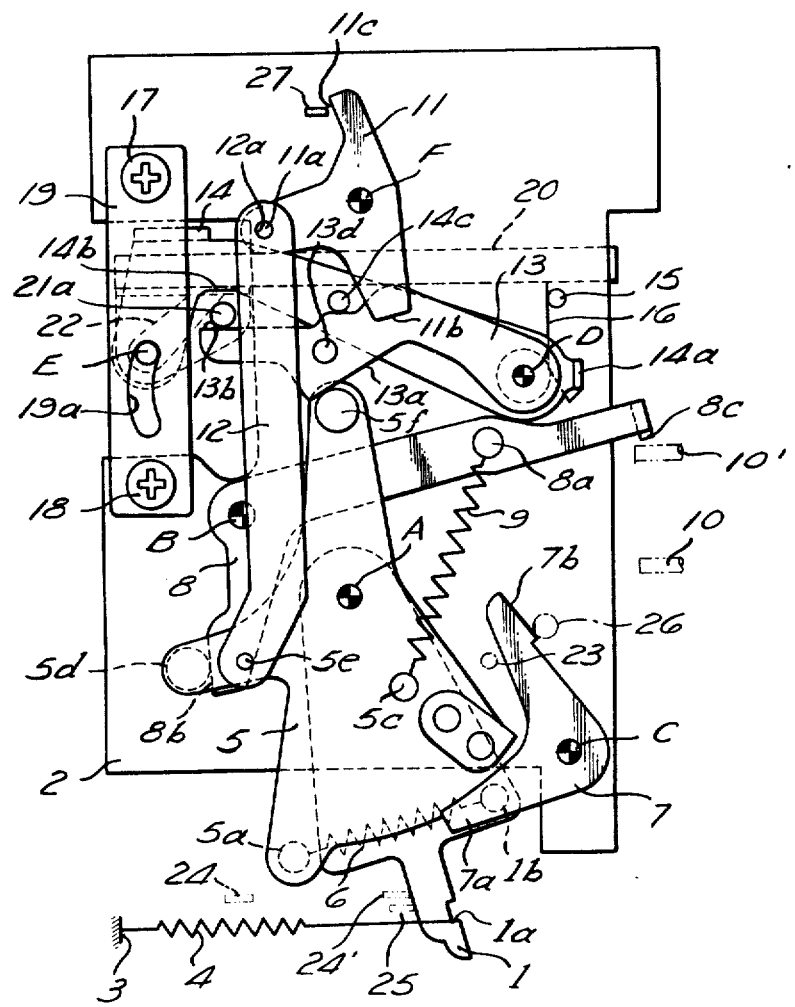
FIG. 3 is an elevational view similar to FIG. 1 depicting the mirror operating arrangement in a shutter operating position.

In FIGS. 1, 2 and 3, a charge lever 1 is rotatably pivoted to a shaft A fixed to a mirror box main body 2 and is urged clockwise about the shaft A by a return spring 4 arranged between the end cutout 1a and the camera main body 3. An operating lever 5 is also rotatably pivoted to the shaft A, and it overlies the charge lever 1 as shown in FIGS. 1, 2 and 3. Between a projection 1b of the reverse side of the charge lever 1 and a projection 5a of the reverse side of the operating lever 5, there is provided a power spring 6 so that the charge lever 1 is urged clockwise while the operating lever 5 is urged counterclockwise. In FIG. 1 the end portion 1c of the charge lever 1 abuts against the projection 5a so that the power spring 6 does not contract further than as shown in FIG. 1.

An engaging lever 7 is rotatably pivoted to a shaft C fixed to the mirror box main body 2. In FIG. 1, the end portion 7a of the engaging lever 7 abuts against an engaging plate 5b fixed to the operating lever 5. Between a projection 5c fixed to the surface of the operating lever 5 and a projection 8a fixed to a diaphragm operating rod 8, which is rotatable about a shaft B fixed to the mirror box main body 2, there is arranged a stop-down spring 9 so that the diaphragm operating rod 8 is urged in a clockwise direction. A following element 5d projecting from the reverse side of the operating lever 5 comes into abutment against a cam surface 8b at the end portion of the diaphragm operating rod 8 and determines the position of the diaphragm operating rod 8, that is, the rod 8 does not further rotate in a clockwise direction.

The automatic diaphragm pin 10 of an interchangeable lens is normally urged upward in the drawing by a spring (not shown). A so-called normal stop-down system is so arranged that an upward movement of the automatic diaphragm pin 10 causes diaphragm blades of an interchangeable lens (not shown) to be closed. The pin 10 abuts against the end portion 8c of the diaphragm operating rod 8 as shown in FIG. 1. However, the downward force of the end portion 8c due to the stop-down spring 9 is greater than the upward urge of the automatic diaphragm pin 10, so that the position of the automatic diaphragm pin 10 is determined by the position of the end portion 8c of the diaphragm operating rod 8.

Between a pin 5e fixed to the surface of the operating lever 5 and a pin 11a fixed to the surface of one end portion of a shutter arrangement disengaging lever 11 which is rotatable about a shaft F fixed to the mirror box main body 2, there is arranged a connecting rod 12, the pins 5e and 11a rotatably engaging holes 12b and 12a, respectively. Thus, the operating lever 5 and the disengaging lever 11 make nearly the same angular movement.

A mirror-up lever 13, which is rotatable about a shaft D fixed to the mirror box main body 2, is provided with a cam surface 13a which abuts against a pin 5f fixed to the surface of the operating lever 5 when the lever 5 rotates in a counterclockwise direction. Thus, a counterclockwise rotation of the operating lever 5 causes a clockwise rotation of the mirror-up lever 13.

A mirror-swing shaft supporting lever 14 is rotatably pivoted to the shaft D fixed to the mirror box main body 2 and a shaft D' which is also fixed, as shown in FIG. 4, to the mirror box main body 2 in coaxial relation with the shaft D. Between a projection 14a of the lever 14 and a projection 15 fixed to the mirror box main body 2, there is arranged a torsion spring 16 wound about the shaft D so that the mirror-swing shaft supporting lever 14 is normally urged in counterclockwise direction in FIGS. 1 –3. A mirror-swing shaft E fixed to the mirror-swing shaft supporting lever 14 abuts against the lower edge of a cocoon-shaped hole 19a of a stopper plate 19 fixed to the mirror box main body 2 with screws 17 and 18, as shown in FIGS. 1 and 2, so that the lever 14 does not make further counterclockwise rotation.

A mirror 20 is rotatable supported in the following manner. As shown in FIG. 4, the shaft E and a shaft E', which is also fixed to the mirror-swing shaft supporting lever 14 in coaxial relation with the shaft E, engage holes 21b and 21b', respectively, of angles 21 and 21' fixed to the mirror 20. A torsion spring 22 is arranged between the end portion 14b of the lever 14 and a projection 21a fixed to the angle 21 and is wound about the shaft E. This torsion spring 22 urges the mirror 20 in a clockwise direction in FIG. 1. The mirror 20 abuts against a mirror stopper 23 fixed to the reverse side of the mirror box main body 2 and stops as shown in FIG. 1.

When the wind-up lever (not shown) of the camera is actuated in a wind-up operation, a charge member 24 moves to the right until it reaches a position 24', and then it returns to the left until it reaches the position 24, as shown in FIG. 1. During this operation, the charge member 24 abuts against the edge 1d of a charge lever 1 and causes the charge lever 1 to make counterclockwise rotation until it reaches a position 1', when an engaging member 25, which moves perpendicularly to the plane of the paper of FIG. 1, enters the rotation range and fixes the charge lever 1 to the position 1'. The operating lever 5, which is urged in counterclockwise direction by the power spring 6, remains engaged as shown in FIG. 1, since the engaging plate 5b engages the end portion 7a of the engaging lever 7. For this reason, the power spring 6 is extended from the length 5a – 1b to the length 5a – 1b' and stores power. The return spring 4 is also extended in the same manner.

Then, when the release button (not shown) is depressed for photographing operation, a disengaging member 26 moves downward (from the state of FIG. 1 to the state of FIG. 3), so that a force is applied to the edge 7b of the engaging lever 7, which edge 7b abuts against the member 26, causing the engaging lever 7 to be rotated in a counterclockwise direction. Then, as shown in FIG. 3, the engaging plate 5b is disengaged from the end portion 7a, so that the power spring 6 causes the operating lever 5 to be rotated in a counterclockwise direction.

The counterclockwise rotation of the operating lever 5 causes the following element 5d to push the diaphragm operating rod 8 at the cam surface 8b so that the diaphragm operating rod 8 makes a counterclockwise rotation against the force of the stopdown spring 9. Accordingly, the end portion 8c of the rod 8 withdraws upward, so that the automatic diaphragm pin 10 moves upward due to the force of a spring arranged in the mechanism of the interchangeable lens (not shown) until it reaches a position 10', when diaphragm-blade stop-down operation is completed.

The counterclockwise rotation of the operating lever 5 also causes the mirror-up lever 13 to make a clockwise rotation so that the end portion 13b of the lever 13 abuts against the projection 21a of the angle 21 and causes the mirror 20 to be rotated in a counterclockwise direction against the force of the torsion spring 22. Since the mirror 20 has a great moment of inertia in this arrangement, simultaneously with pushing up of the projection 21a by the end portion 13b of the mirror-up lever, a force is applied through the mirror rotating shaft E tending to push up the supporting lever 14 against the force of the torsion spring 16. However, a pin 14c fixed to the supporting lever 14 abuts against the end portion 11b of the shutter arrangement disengaging lever 11 so that the supporting lever 14 does not move.

When the mirror-up lever 13 has caused the mirror 20 to make counterclockwise rotation by about 45° from the position of FIG. 1, the shutter arrangement disengaging lever 11 rotates in a counterclockwise direction up to the dot-dot-and-dash line position of FIG. 1, so that the mirror rotation shaft supporting lever 14 becomes able to make clockwise rotation. At the same time, the edge 13c of the mirror-up lever 13 abuts against the pin 14c. After this, the mirror-up lever 13 and the mirror rotation shaft supporting lever 14 make an angular movement as one body until they reach the state of FIG. 3, then the shaft E abuts against the upper edge of the cocoon-shaped hole 19a, and the mirror 20 reaches its fully swung position. The counterclockwise rotation of the operating lever 5 causes the shutter arrangement disengaging lever 11 to make a counterclockwise rotation, so that the edge 11c of the lever 11 abuts against a shutter arrangement engaging member 27 in the state of FIG. 1 and pushes it to the left up to the position of FIG. 3. Accordingly, the shutter arrangement begins to operate.

In the return operation, a signal of completion of the operation of the shutter arrangement is transmitted to the engaging member 25 so that the engaging action of the engaging member 25 is eliminated. Accordingly, due to the force of the return spring 4, the charge lever 1 makes a clockwise rotation, and also the operating lever 5 makes a clockwise rotation. Then, in entirely reverse order with respect to the order of the above mentioned operation, the whole arrangement returns to its initial state with the end portion 7a of the engaging lever abutting against the engaging plate 5b, so that preparation for the next wind-up operation is completed.

When the diaphragm is to be individually manually stopped down, the manual stop-down button (not shown) of the camera is depressed. Then, as shown in FIG. 1, a stop-down member 28 moves upward into abutment against the projection 8a to the position shown at 28' causing the diaphragm operating rod 8 to make counterclockwise rotation against the force of the stop-down spring 9 so that the automatic diaphragm pin 10 moves to the position 10' and the stop-down operation is completed. When the manual stop-down button is released, the stop-down member 28 returns from the position 28' to the position 28, the diaphragm operating rod 8 makes a returning movement owing to the action of the stop-down spring 9 and the automatic diaphragm pin 10 returns from the position 10' to the position 10 against the spring force acting in the direction of from 10 to 10' so that the diaphragm becomes fully open.

When the mirror is to be individually swung up, the individual mirror-up member (not shown) of the camera is actuated. Then, the mirror-up member 29 of FIG. 1 moves upward into abutment against a pin 13d fixed to the mirror-up lever 13 and causes the lever 13 to make clockwise rotation. As a result, as shown in FIG. 2, an end portion 13b pushes upward the projection 21a of the angle 21 against the force of the torsion spring 22, so that the mirror 20 makes counterclockwise rotation into a position in which the mirror 21 stops with the end portion lifted, as shown in FIG. 2. At this time, a force tending to cause clockwise rotation is applied through the shaft E to the mirror rotation shaft supporting lever 14. However, since the end portion 11b of the shutter arrangement disengaging lever abuts against the pin 14c, the mirror rotation shaft supporting lever 14 makes scarcely any movement.

When photographing operation is made with individual mirror-up, the release button is depressed, the engaging lever end portion 7a is disengaged from the engaging plate 5b, and the operating lever 5 makes counterclockwise rotation. Then, the pin 5f moving to the left is off from the cam surface 13a of the mirror-up lever 13 in the position as shown in solid line in FIG. 2 in the early part of the rotation movement, then, at nearly the end of the rotation movement, the pin 5f abuts against the cam surface 13a and causes the mirror-up lever 13 to make clockwise rotation so that the end portion 13b pushes up the projection 21a of the angle 21. As a result, the mirror rotation shaft supporting lever 14 moves from the position of FIG. 2 to the position of FIG. 3, so that the mirror 20 is fully swung up as shown in FIG. 3. When the operating lever 5 has made counterclockwise rotation up to such rotation that the end portion 13b of the mirror-up lever 13 comes into abutment against the projection 21a of the angle 21, the end portion 11b of the shutter arrangement disengaging lever has escaped to the right from the position in which it abuts against the pin 14c, so that the mirror rotation shaft supporting lever 14 is not prevented from making clockwise rotation.

The pin 14c acts as mentioned above. Now, if this pin 14c does not exist, the object can be attained by making the force of the torsion spring 16 applying counterclockwise urge to the lever 14 considerably stronger, but this is accomplished by a disadvantage that the force of the power spring 6 must be made stronger.

In conventional individual mirror-up photographing operation, the mirror is fully swung up so that a shock is produced through the power spring action which is made stronger to the extent of the unnecessariness part of the mirror swing-up action. Now, according to the present invention, the mirror is first moved halfway up, and then, upon shutter release action, in the last stage of the power spring action the mirror is further moved up, so that there is obtained an advantage that the shock is absorbed to the extent of the further upward movement of the mirror so as to produce a buffer effect.

What is claimed is:

1. In combination, a mirror and a mirror mounting assembly for movably mounting said mirror in a single lens reflex camera with reduced shock loads upon movement of said mirror to a shutter operating position, said mirror mounting assembly comprising mounting lever means providing a generally horizontal, upwardly translatable mirror rotation axis for supporting said mirror adjacent an end of said mirror in a viewing position, said mirror being rotatable about said mirror rotation axis, in a first position of the axis, from said mirror viewing position to translate the free end of the mirror in an upward direction and thereby position the mirror at an angularly displaced mirror-up position prior to shutter operation, said mounting lever means being adapted to be supported in a camera for rotational movement to translate said mirror rotation axis from said first axis position and said mirror from its mirror-up position further in said upward direction and to said shutter operating position.

2. The combination as set forth in claim 1 wherein said mounting lever means are adapted to be supported in a camera at a lever rotation axis located adjacent an end of said mounting lever means, and said mirror rotation axis comprises swing shaft means secured to said mirror and carried by said mounting lever means adjacent an opposite end of said mounting lever means remote from said lever rotation axis.

3. The combination as set forth in claim 2 wherein said swing shaft means are upwardly translatable within elongated guide means adapted to be fixed to a camera.

4. The combination as set forth in claim 1 wherein said mounting lever means include pin means arranged to cooperate with shutter operating means carried by a camera to prevent shutter operation prior to the translation of said mirror to said mirror-up position.

5. A method of reducing the shock upon movement of a mirror in a single lens reflex camera from a viewing position to a remote shutter operating position comprising supporting said mirror in a viewing position for rotational movement about a mirror rotation axis adjacent one end of the mirror, rotating said mirror about said mirror rotation axis, in a first position of the axis, to translate the free end of the mirror in an upward direction and thereby position the mirror at an angularly displaced mirror-up position prior to shutter operation, and then, upon shutter operation, translating said mirror rotation axis from said first axis position and said mirror from its mirror-up position further in said upward direction to said remote shutter operation position.

6. A method as set forth in claim 5 wherein the step of rotating said mirror about said mirror rotation axis includes moving said free end of the mirror to substantially said remote shutter operating position.

7. A method as set forth in claim 5 wherein the step of translating said mirror rotation axis and said mirror includes both rotational and nonrotational movement.

8. A method as set forth in claim 5 wherein the step of rotating said mirror about said mirror rotation axis includes movement in a first angular direction, and the step of translating said mirror rotation axis and said mirror includes movement in a second angular direction opposite to said first angular direction.

* * * * *